(12) United States Patent
Eynav

(10) Patent No.: US 10,271,634 B1
(45) Date of Patent: Apr. 30, 2019

(54) RETENTION DEVICE, A RETENTION DEVICE SYSTEM AND METHOD OF USING A RETENTION DEVICE SYSTEM

(71) Applicant: Shai Eynav, Lansing, NY (US)

(72) Inventor: Shai Eynav, Lansing, NY (US)

(73) Assignee: SPIDER GEAR, LLC, Lansing, NY (US)

( * ) Notice: Subject to any disclaimer, the term of this patent is extended or adjusted under 35 U.S.C. 154(b) by 0 days.

(21) Appl. No.: 15/728,769

(22) Filed: Oct. 10, 2017

(51) Int. Cl.
*A45F 5/02* (2006.01)
*A45F 5/14* (2006.01)
*A44B 17/00* (2006.01)

(52) U.S. Cl.
CPC ............ *A45F 5/14* (2013.01); *A44B 17/0011* (2013.01); *A44D 2201/30* (2013.01); *A45F 5/021* (2013.01)

(58) Field of Classification Search
CPC .......... A45F 2005/026; A45F 2005/028; A45F 5/02; A45F 5/021; A45F 2200/0575; F16M 11/14; Y10S 224/904
See application file for complete search history.

(56) References Cited

U.S. PATENT DOCUMENTS

| | | | |
|---|---|---|---|
| 2,743,894 A * | 5/1956 | Ostnas | A45F 5/02 224/271 |
| 5,014,892 A | 5/1991 | Copeland | |
| 5,201,858 A * | 4/1993 | Otrusina | A45F 5/02 224/197 |
| 5,375,749 A | 12/1994 | Oliva | |
| 6,880,794 B1 * | 4/2005 | Kahn | A45F 5/02 24/115 R |
| 7,980,771 B2 | 7/2011 | Chamberlayne | |
| 2006/0261116 A1 | 11/2006 | Brandeis | |
| 2007/0099469 A1 * | 5/2007 | Sorensen | A45F 5/02 439/289 |
| 2011/0019081 A1 | 1/2011 | Eynav | |
| 2011/0142436 A1 | 6/2011 | Eynav | |
| 2017/0235211 A1 | 8/2017 | Eynav | |

FOREIGN PATENT DOCUMENTS

WO    PCT/US08/76878    9/2008

\* cited by examiner

*Primary Examiner* — Adam J Waggenspack
(74) *Attorney, Agent, or Firm* — Donald J. Lecher

(57) ABSTRACT

A retention device includes a body having a channel disposed in the body, the channel including a substantially linear axis and having at least one arcuate-shaped cross section beginning at a first distal end of the channel. A receiving socket is disposed in the body at a second distal end of the channel, the receiving socket including at least one recessed spherical-shaped section. A continuous slot extends through the body to the channel and defining a substantially linear section from the first distal end of the channel along the substantially linear axis of the channel to the second distal end of the channel. The continuous slot extends through the body to the receiving socket and defines a substantially 90-degree arcuate section from a first point orthogonal to the substantially linear axis at the second distal end of the channel to a second point on the substantially linear axis of the channel.

13 Claims, 7 Drawing Sheets

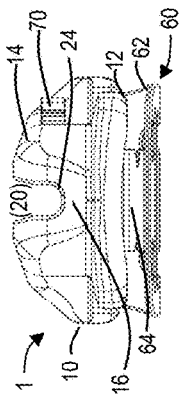
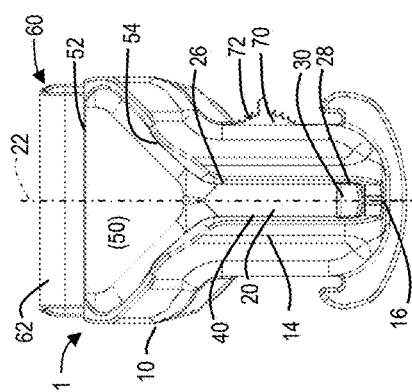
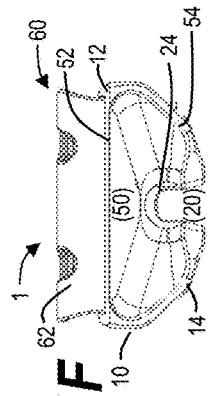
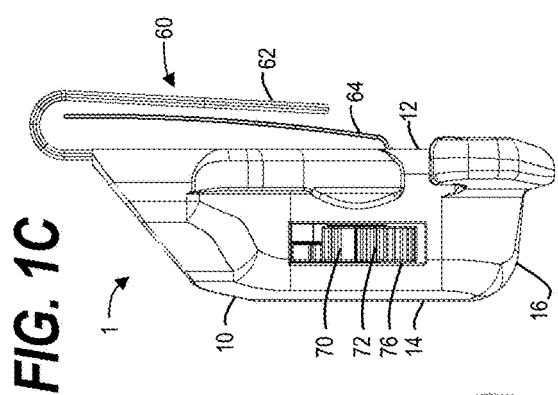
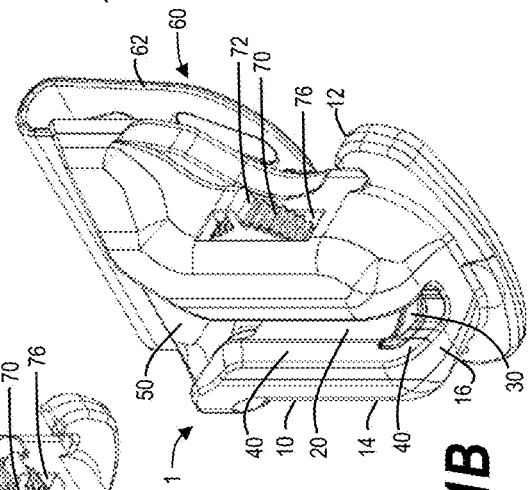
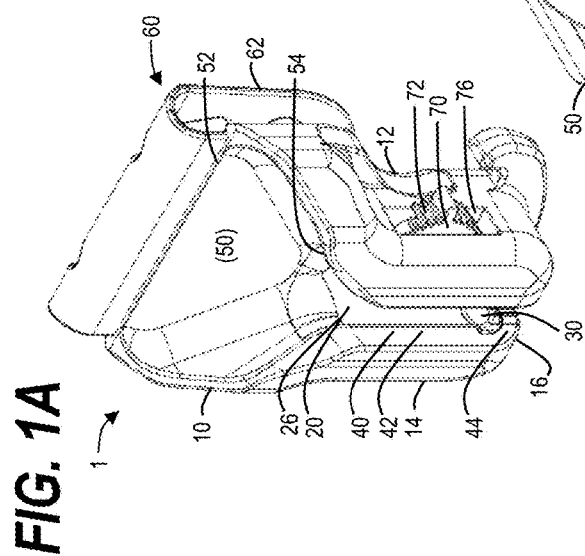

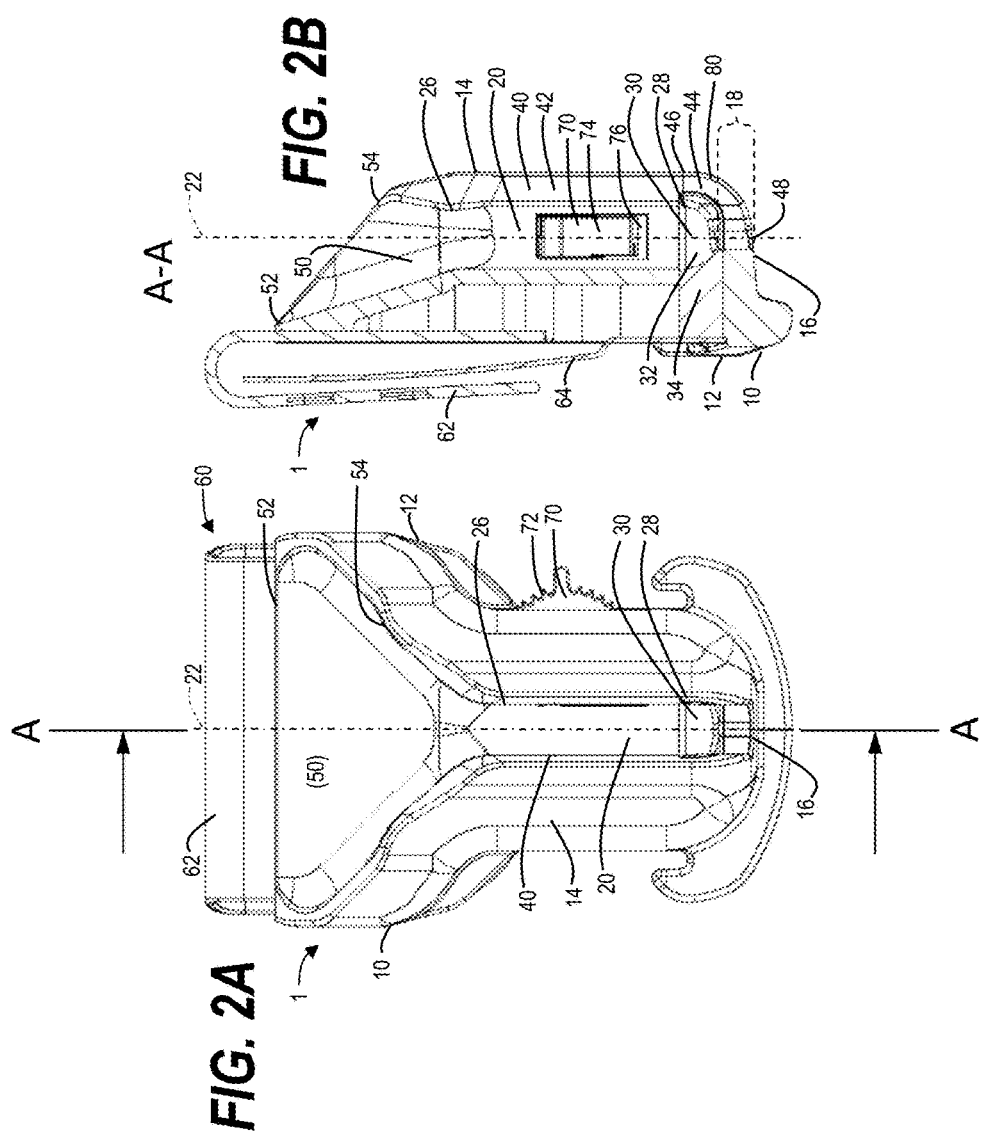

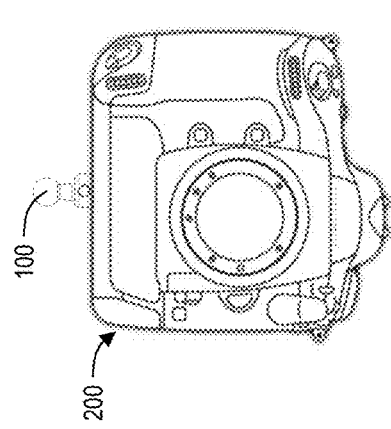
FIG. 3C
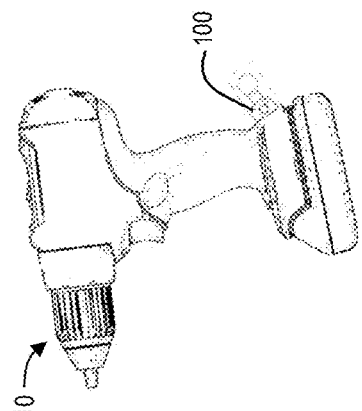
FIG. 3D
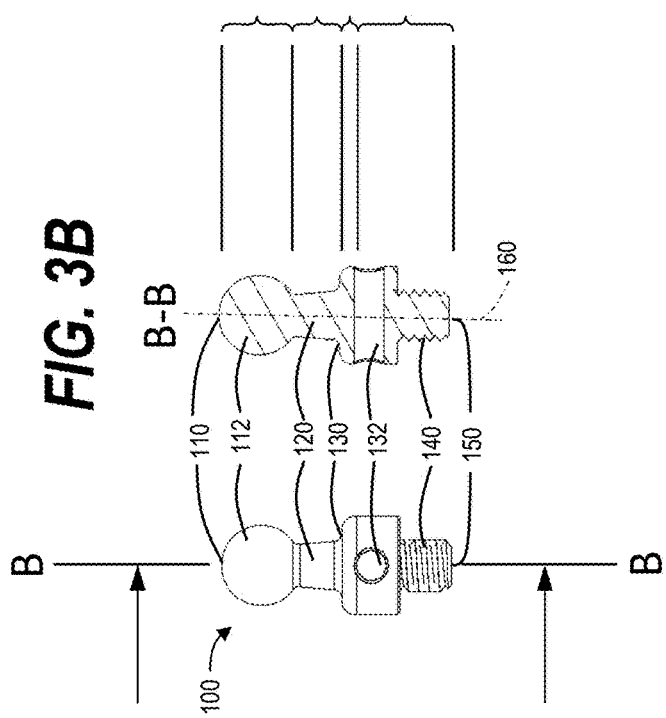
FIG. 3A
FIG. 3B

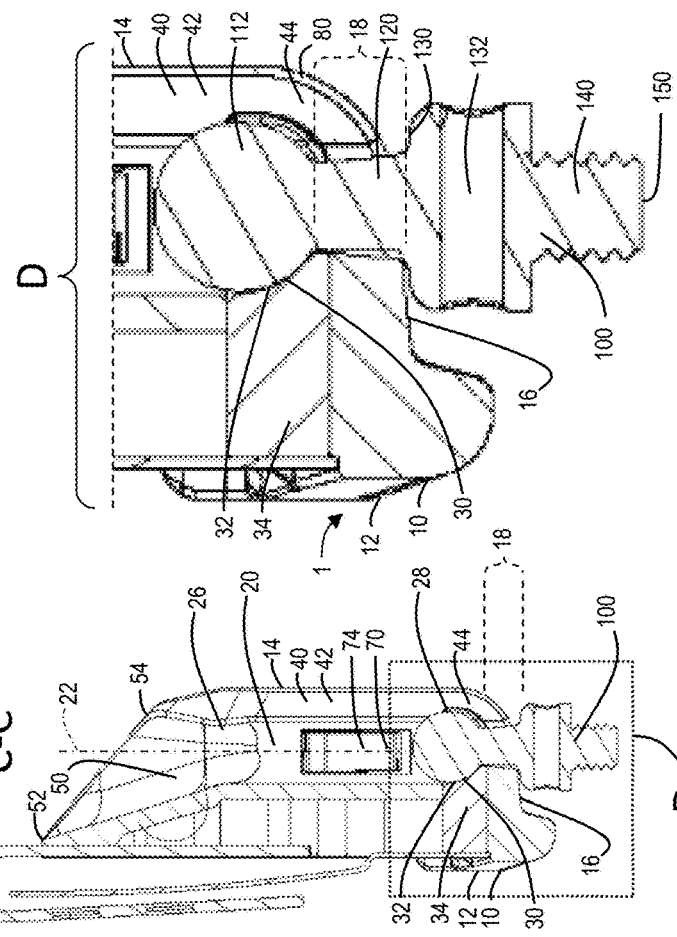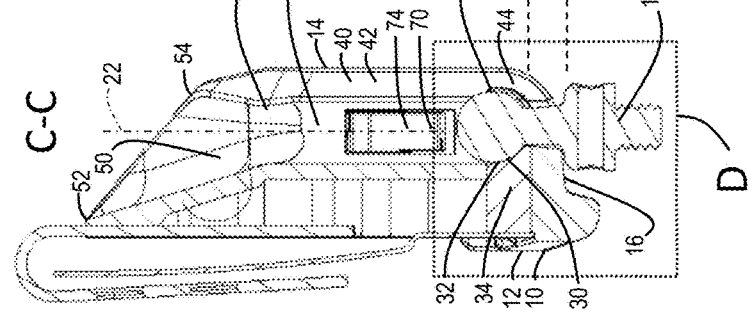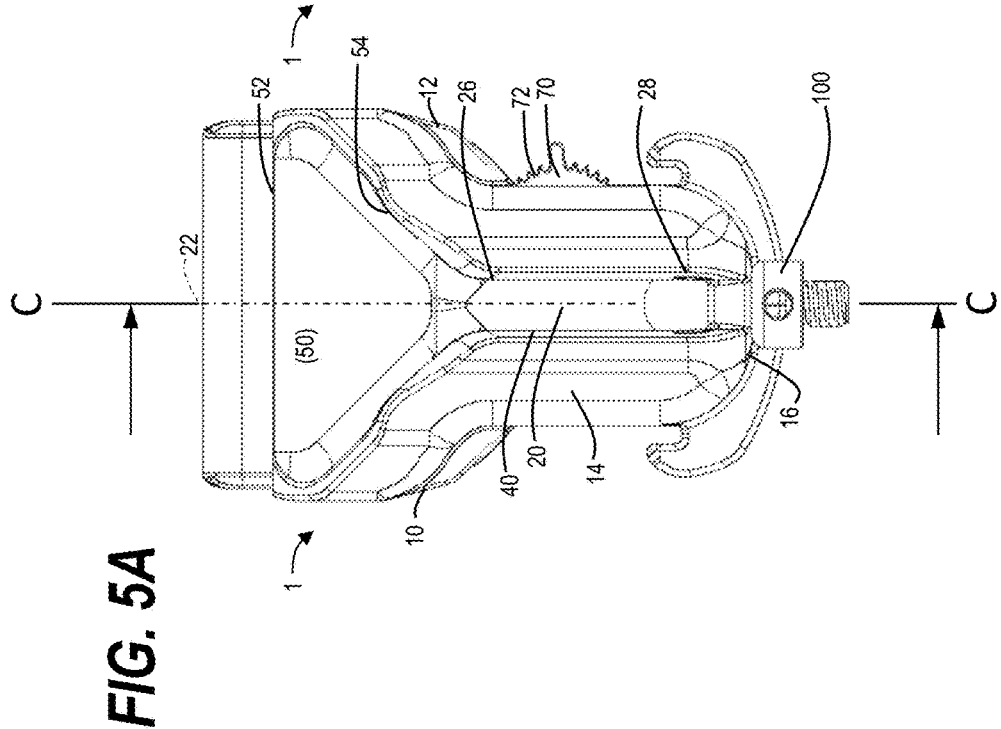

RETENTION DEVICE, A RETENTION DEVICE SYSTEM AND METHOD OF USING A RETENTION DEVICE SYSTEM

FIELD OF INVENTION

The embodiments herein describe a retention device that retains equipment in a secure position and further includes a rapid release feature of equipment from the securely retained position. The retention device allows portable equipment, tools and/or other devices to be carried in a secure locked condition either about the body of a person while allows for quick release of those items from the retention device.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a retention device includes a body having a channel disposed in the body along a substantially linear axis, the channel having at least one arcuate-shaped cross section beginning at a first distal end of the channel, and a receiving socket disposed in the body at a second distal end of the channel, where the receiving socket includes at least one recessed spherical-shaped section. The body further has a continuous slot extending through the body to the channel and defines a substantially linear section from the first distal end of the channel along the substantially linear axis of the channel to the second distal end of the channel, and extends through the body to the receiving socket and defines a substantially 90-degree arcuate section from a first point orthogonal to the substantially linear axis at the second distal end of the channel to a second point on the substantially linear axis of the channel.

In another embodiment disclosed herein, a retention system includes a retention device including a body having a body having a channel disposed in the body along a substantially linear axis, the channel having at least one arcuate-shaped cross section beginning at a first distal end of the channel, a receiving socket disposed in the body at a second distal end of the channel, where the receiving socket includes at least one recessed spherical-shaped section. The body further has a continuous slot extending through the body to the channel and defines a substantially linear section from the first distal end of the channel along the substantially linear axis of the channel to the second distal end of the channel, and extends through the body to the receiving socket and defines a substantially 90-degree arcuate section from a first point orthogonal to the substantially linear axis at the second distal end of the channel to a second point on the substantially linear axis of the channel. The retention system further includes a pin having a first distal end having a substantially spherical section, a rod-shaped section connected to the first distal end of the pin, a shoulder section connected to the rod-shaped section, and a fastener mechanism connected to the shoulder section at a second distal end of the pin. A thickness of the continuous slot extending through the body receives the rod-shaped section of the pin, allows free rotation of the pin around a longitudinal axis of the pin within the continuous slot along the substantially linear axis of the channel, and prevents motion of the pin along the substantially linear axis of the channel when the longitudinal axis of the pin is substantially co-linear with the substantially linear axis of the channel.

In another embodiment disclosed herein, a method of using a retention system includes providing a retention device including a body having a channel disposed in the body along a substantially linear axis, the channel having at least one arcuate-shaped cross section beginning at a first distal end of the channel, a receiving socket disposed in the body at a second distal end of the channel, the receiving socket including at least one recessed spherical-shaped section, and a continuous slot extending through the body to the channel and defining a substantially linear section from the first distal end of the channel along the substantially linear axis of the channel to the second distal end of the channel, and extending through the body to the receiving socket and defining a substantially 90-degree arcuate section from a first point orthogonal to the substantially linear axis at the second distal end of the channel to a second point on the substantially linear axis of the channel. The method further includes providing a pin having a first distal end of the pin having a substantially spherical section, a rod-shaped section connected to the first distal end of the pin, a shoulder section connected to the rod-shaped section, and a fastener mechanism connected to the shoulder section at a second distal end of the pin, positioning the substantially spherical section of the pin proximate the first distal end of the channel of the retention device. The method further includes translating the substantially spherical section of the pin through a portion of the channel of the retention device, wherein the longitudinal axis of the pin is oriented at a substantially orthogonal angle relative to the substantially linear axis of the channel during translation. The method further includes translating the first spherical end of the pin from the channel into the recessed spherical-shaped section of the receiving socket, rotating the pin about the receiving socket such that the longitudinal axis of the pin is substantially aligned with the substantially linear axis of the channel. The method further includes that when the longitudinal axis of the pin is substantially aligned with the substantially linear axis of the channel, the pin within the receiving socket is prevented from translating out of the spherical-shaped socket and into the channel and simultaneously allows the pin to freely rotate about the substantially linear axis of the pin.

BRIEF DESCRIPTION OF THE SEVERAL VIEWS OF THE DRAWINGS

The embodiments of the invention will be better understood from the following detailed description with reference to the drawings, which are not necessarily drawing to scale and in which:

FIG. 1A illustrates a top front perspective view of a retention device;

FIG. 1B illustrates a bottom front perspective view of the retention device;

FIG. 1C illustrates a side view of the retention device;

FIG. 1D illustrates a bottom view of the retention device;

FIG. 1E illustrates the front view of the retention device;

FIG. 1F illustrates a top view of the retention device;

FIG. 2A illustrates a front view of the retention device;

FIG. 2B illustrates a cross section view at lines A-A of the retention device;

FIG. 3A illustrates a front view of a pin;

FIG. 3B illustrates a cross section view at lines B-B of the pin;

FIG. 3C illustrates the pin exemplary attached to photographic device;

FIG. 3D illustrates the pin exemplary attached to hand tool device;

FIG. 5A illustrates the front view of the retention device and pin;

FIG. 5B illustrates a cross section view at lines C-C of the retention device and pin;

FIG. 5C illustrates an enlarged view D of a bottom portion of FIG. 5B;

DETAILED DESCRIPTION

Figure 4:
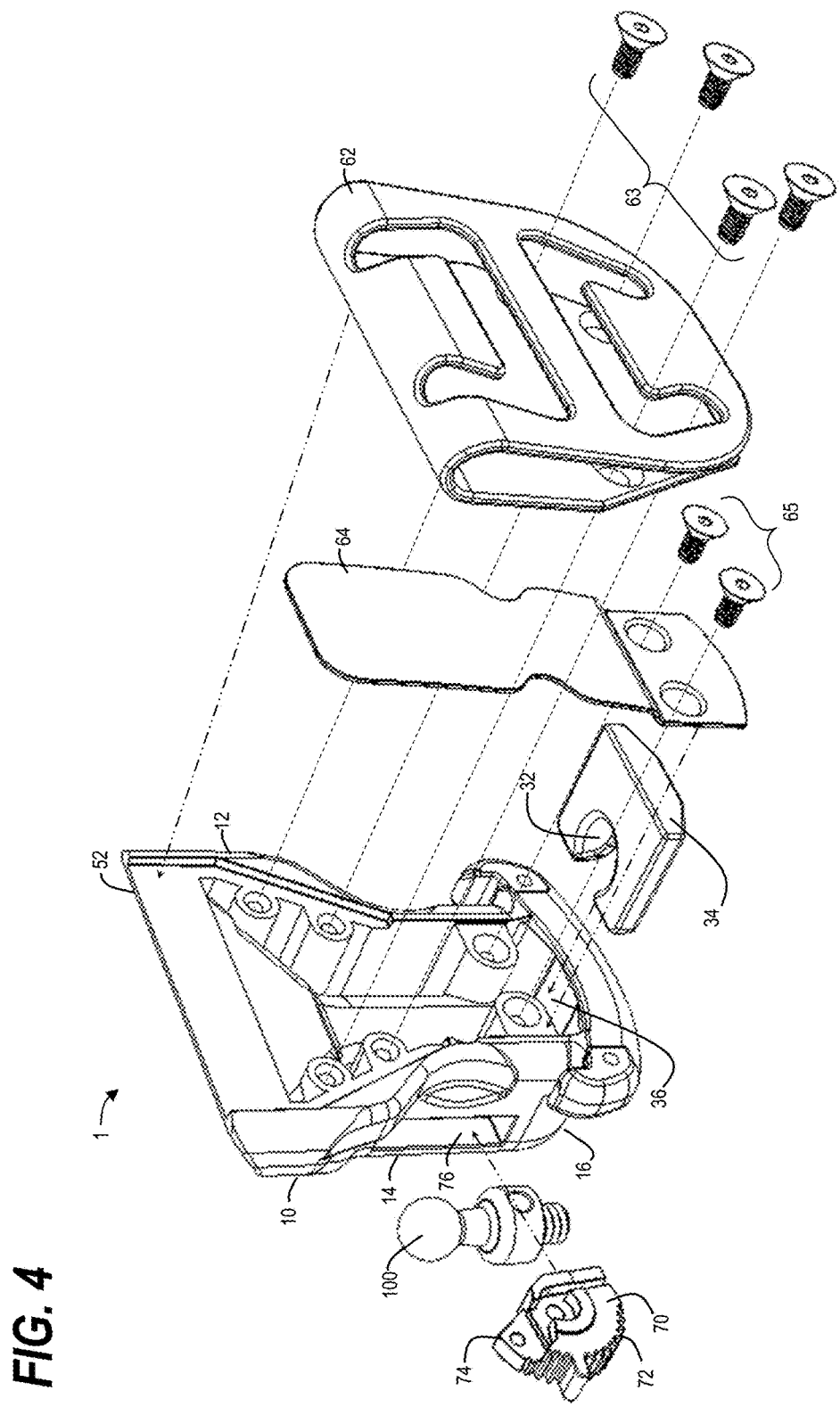
FIG. 4 illustrates perspective top rear perspective assembly view of retention device and pin.

FIGS. 1A to 1F and FIGS. 2A and 2B illustrate multiple views of a retention device (1). A retention device (1) generally includes a body (10) having a rear surface (12), a front surface (14) and a lower surface (16). A channel (20) runs from an approximate mid-point in the body (10) to a distal end proximate the lower surface (16) of the body (10). The channel (20) is further enclosed by a thickness (18), (see FIG. 2B), of the body (10) between the lower surface (16) and a second distal end (28) of the channel (20).

The channel (20) has a substantially linear axis (22) and an arcuate-shaped cross section (24) that extends from a first distal end (26) of the channel (20) to a second distal end (28) of the channel (20). A receiving socket (30) is disposed at the second distal end (28) of the channel (20), wherein the receiving socket (30) includes a recessed spherical-shaped section (32).

FIGS. 2A to 2B further illustrate a continuous slot (40) disposed between the front surface (14) of the body (10) and the channel (20). The continuous slot (40) comprises a substantially linear section (42) and a substantially 90-degree arcuate section (44). The substantially linear section (42) of the continuous slot (40) starts proximate the first distal end (26) of the channel (20) and runs to a first point (46) orthogonal to the substantially linear axis (22) at the second distal end (28) of the channel (20). The substantially 90-degree arcuate section (44) continues from the first point (46) to a second point (48) on the substantially linear axis (22) of the channel (20), and extends beyond the second point (48) on the substantially linear axis (22) of the channel (20). The substantially 90-degree arcuate section (44) furthermore extends into recessed spherical-shaped section (32) of the receiving socket (30) to allow for a rod-shaped section (120) of a pin (100), (described below), to rotate there through.

The body (10) further includes a unitary interior surface area of an elongated cone-shaped section (50) having a rear top portion (52) and a front top portion (54). The unitary interior surface area of the elongated cone-shaped section (50) connects seamlessly to the first distal end (26) of the channel (20) and is configured such that the channel (20) is disposed closer to the front surface (14) of the body (10) than to the rear surface (12) of the body (10). This feature of the channel (20) being biased in a forward direction of the body (2) enables objects that are attached to the retaining device (1) to be positioned further away from the rear surface (12) of the body (2) to enable objects to more freely rotate and be manipulated when the objects are securely attached to the retaining device (1), (see below description and FIGS. 3C and 3D).

A spring-biased clip assembly (60) is attached on the rear surface (12) of the body (10) and includes a clip (62) and a spring (64). The spring-biased clip assembly (60) enables the body (10) of the retention device (1) to be secured to a belt, fabric edge, any device capable of being worn or fitted upon a user, or any other type of tool holder.

The body (10) further includes a locking thumb-wheel (70) received within a side slot (76) of the body (10). The locking thumb-wheel (70) includes knurling (72) on an outer circumference capable of being manipulated by user, and a locking block (74) that is capable of being moved into and out of the channel (20).

FIG. 3A illustrates a front view of a pin (100), and FIG. 3B illustrates a cross section view at lines B-B of the pin (100) in FIG. 3A. Pin (100) includes a first distal end (110) having a substantially spherical section (112), a rod-shaped section (120) beneath the substantially spherical section (112), a shoulder section (130) that may include a fastening through hole (132), and a fastener mechanism (140) disposed at a second distal end (150) of the pin (100). The rod-shaped section (120) comprises a diameter less than the diameter of the substantially spherical section (112), and less than the diameter of the shoulder section (130). The fastener mechanism (140) is illustrated herein as being a threaded fastener, however, any other equivalent fastener may be substituted for the illustrated threaded fastener mechanism (140).

FIG. 3C illustrates an exemplary embodiment of the pin (100) being attached to a first object (200), for example, photographic device. In this instance, the pin (100) may be directly attached to a bottom portion of a first object, (as shown), or may be attached via a mounting plate or equivalent hardware, (not shown), that is further attached to the first object (200). FIG. 3D illustrates a second exemplary embodiment of the pin (100) being attached to a second object (210), for example, a powered hand tool. In this instance, the pin (100) may be directly to attached to a top portion of the first object (as shown), or may be attached via a mounting bracket or equivalent hardware, (not shown), further attached to the second object (210).

FIG. 4 illustrates a perspective top rear perspective assembly view of retention device (1) and pin (100). The body (10) receives, into a lower rear-facing slot (36), a receiving socket insert (34) that contains the receiving socket (30). A separate receiving socket insert (34) from the body (10) enables the receiving socket (30) including the recessed spherical-shaped section (32) to be made of a harder and more durable material than that of the body (10). In one embodiment, the separate receiving socket insert (34) may be made of may be made of a harder, denser and/or more wear-resistance material than the surrounding material of the body (10). For example, the body (10) may be made of machined or cast aluminum and the receiving socket insert (34) containing the receiving socket (30) may be made of a harder machined or stamped metal such as stainless steel or heat-treated steel. In another example, the body (10) may be made of a molded or machined high-density plastic and the receiving socket insert (34) containing the receiving socket (30) may be made of a higher density plastic or a wear-resistant plastic different from the surrounding material of the body (10). A further mixed material example may provide a wear-resistance plastic comprising the receiving socket insert (34) containing the receiving socket (30) being used where the surrounding material of the body (10) may be metallic in composition.

FIG. 4 further illustrates the spring (64) being attached to the rear surface (12) of the body (10) by spring fasteners (65). The spring (64) retains the receiving socket insert (34) within the lower rear-facing slot (36) when spring fasteners (65) are fastened through the spring (64) into corresponding fastener receiving sections of the body (10). The clip (62) is attached to the rear surface (12) of the body (10) by clip fasteners (63). The locking thumb-wheel (70) may be rotationally disposed with a locking thumb-wheel receiving slot (76). FIG. 4 further illustrates pin (100) disposed proximate the front surface (14) of the body (10).

FIGS. 5A to 5C illustrates the retention device (1) coupled with the pin (100) in a fully downward and locked state in channel (20). The substantially spherical section (112) of the pin (100) is seated in the recessed spherical-shaped section (32) of the receiving socket (30) at the second distal end (28) of the channel (20). The recessed spherical-shaped section (32) is formed in the receiving socket insert (34) and receives a lower portion of the substantially spherical section (112) proximate the rod-shaped section (120) of the pin (100). FIG. 5B illustrates the locking block (74) of the locking thumb-wheel (70) located proximate an interior portion of the channel (20) and immediately above the first distal end (110) of the pin (100). When the locking block (74) is rotated by the thumb-wheel (70) into the channel (20), the pin (100) when seated in the recessed spherical-shaped section (32) is prevented from moving in an upward direction along the substantially linear axis (22) of the channel (20).

Figure 6B:
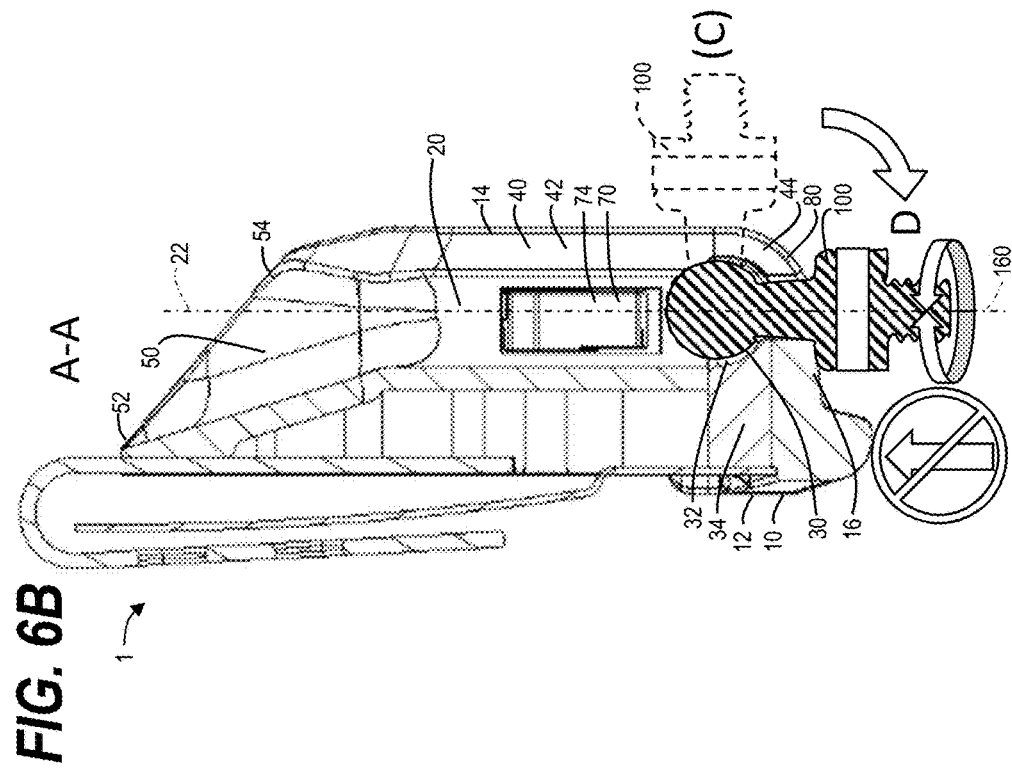
FIG. 6B illustrates a cross section view at lines A-A with pin in Positions D with respect to the retention device.
Figure 6A:
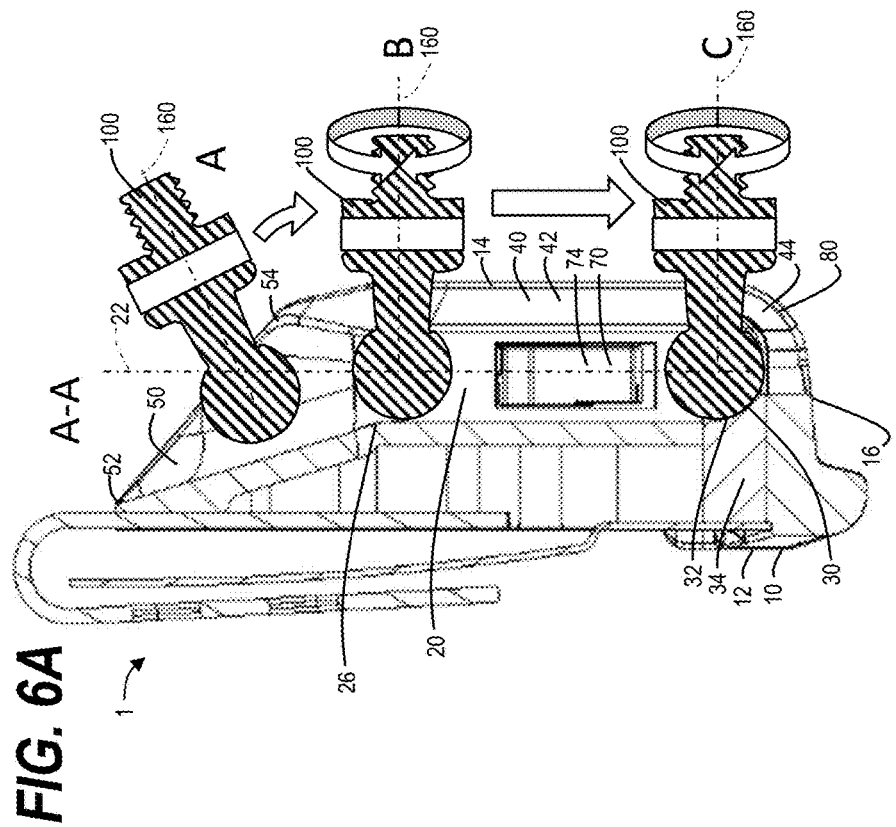
FIG. 6A illustrates a cross section view at lines A-A with pin in Positions A, B and C with respect to the retention device.

FIGS. 6A and 6B illustrate a cross section view at lines A-A, (from FIG. 2A), with pin (100) exemplary travelling through and/or into four discrete positions, (Positions A, B, C and D), with respect to the retention device (1). First, the pin (100) moves into Position A such that the substantially spherical section (112) enters the area of the unitary interior surface of the elongated cone-shaped section (50) between the rear top portion (52) and front top portion (54). The slope between the rear top portion (52) and the first distal end (26) of the channel (20) and the slope between the front top portion (54) and the first distal end (26) of the channel (20) allows the substantially spherical section (112) of the pin (100) to be oriented in almost any direction as it approaches and engages the unitary interior surface area of an elongated cone-shaped section (50). When the substantially spherical section (112) of the pin (100) approaches the topmost surfaces of the unitary interior surface area of an elongated cone-shaped section (50), the substantially spherical section (112) may be located behind, in front of, and/or to the right of left the substantially linear axis (22) of the channel (20). Additionally, the longitudinal axis (160) of pin (100) in Position A may be oriented in almost any direction as it moves into the topmost surfaces of the unitary interior surface area of an elongated cone-shaped section (50).

As the pin (100) travels in a downward direction from Position A with respect to the body (10) in a similar direction as the substantially linear axis (22), Position B illustrates the rod-shaped section (120) of the pin (100) engaging the substantially linear section (42) of the continuous slot (40) near the first distal end (26) of the channel (20). As the pin (100) travels from Position B to Position C, the substantially spherical section (112) of the pin (100) is captured within the channel (20) by means of the continuous slot (40) being sized to receive the rod-shaped section (120) of the pin (100), yet retaining the substantially spherical section (112) of the pin (100) within the channel (20). The combination of the geometry of the pin (100), the channel (20) and the continuous slot (40), constrains the pin (100) to translate substantially only along the direction of the substantially linear axis (22), yet, at the same time, allowing the pin (100) to fully rotate about its own longitudinal axis (160). While pin (100) travels from Position B to Position C, the longitudinal axis of the pin (100) is substantially orthogonal to the substantially linear axis (22) of the channel (20) and is maintained in this position since the continuous slot (40) is substantially similar to the distance of the rod-shaped section (120) between the substantially spherical section (112) and the shoulder section (130).

As the pin (100) reaches the second distal end (28) of the channel (20) at Position C, the substantially spherical section (112) is cradled by the recessed spherical-shaped section (32) of the receiving socket (30). Although the pin (100) in Position C is still able to rotate about its own longitudinal axis, the substantially spherical section (112) is no longer able to translate beyond the second distal end (28) of the channel (20).

FIG. 6B illustrates a cross section view at lines A-A, (from FIG. 2A), with pin (100) in Position D with respect to the retention device (1) as the pin (100) rotates about the spherical center of the receiving socket (30) while rod-shaped section (120) moves through the substantially 90-degree arcuate section (44) of the continuous slot (40) until the longitudinal axis of the pin (100) is substantially co-linear with the substantially linear axis (22) of the channel (20). In Position D, the pin (100) is able to freely rotate about its longitudinal axis (160), however, the pin (100) is prevented from moving an upward direction along the substantially linear axis (22) since the shoulder section (130) of the pin (100) impinges upon the lower surface (16) of the body (10) being the outer surface of the substantially 90-degree arcuate section (44) of the continuous slot (40).

FIGS. 6A and 6B additionally illustrate the removal of pin (100) from the channel (20) of the retention device (1) in reverse order from the above description. If the pin (100) is in Position D, as illustrated in the FIG. 6B, the device attached to the fastener mechanism (140) of pin (100), (for example, see FIGS. 3C and 3D), may be rotated in an upward direction such that the longitudinal axis (160) of pin (100) is rotated through the substantially 90-degree arcuate section (44) of continuous slot (40) into Position C. The device attached to the fastener mechanism (140) of pin (100) is then lifted in an upward direction substantially parallel with the substantially linear axis (22) of channel (20) towards Position B, and then finally out of and away from the unitary interior surface area of the elongated cone-shaped section (50) of the body (10) towards Position A.

In an additional embodiment, the locking thumb-wheel (70) in the thumb-wheel receiving slot (76) may be rotated such that the locking block (74) protrudes into the channel (20), (see FIGS. 5B and 5C), such that the substantially spherical section (112) of the pin (100) all in Position C or Position D may be locked or blocked from translating in an upward direction from the recessed spherical-shaped section (32) of the receiving socket insert (34). After a user disengages the locking block (74) by rotating the locking thumb-wheel (70), the pin (100) is able to freely translate in an upward direction along the substantially linear axis (22) of the channel (20).

In an additional embodiment, a metal shield (80), (see FIG. 2B), is disposed on an exterior surface of the body (10) proximate the substantially 90-degree arcuate section (44) of continuous slot (40). The metal shield (80) may be disposed starting from the first point (46) orthogonal to the substantially linear axis (22) at the second distal hand (28) of the channel (20) to a peripheral area on the body (10) proximate the second point (48) on the substantially linear access (22) of the channel (20). The metal shield (80) is provided as a contact surface for the shoulder section (130) of the pin (100) on the body (10) when the pin (100) is provided anywhere within the range of Position C and Position D.

Figure 7:
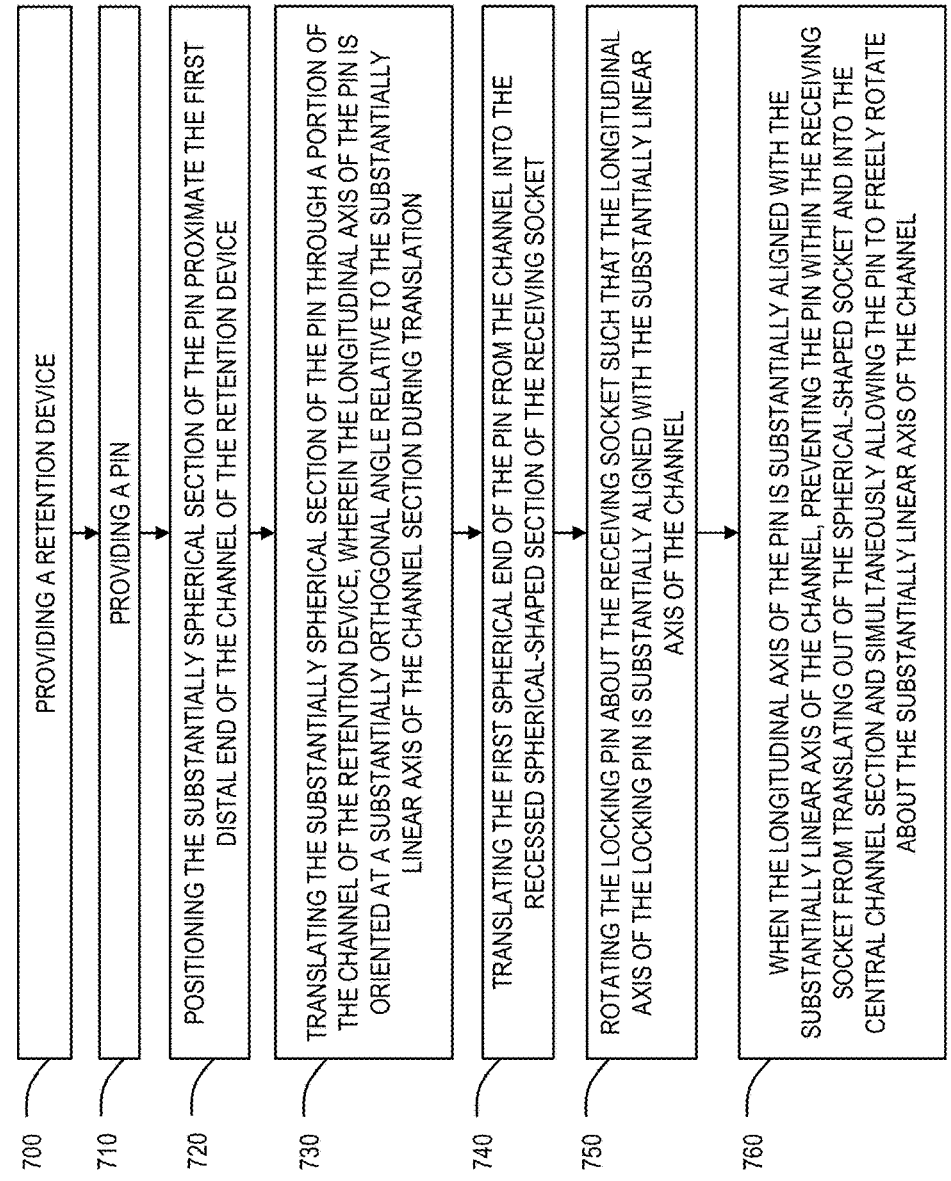
FIG. 7 illustrates a method flowchart for using a retention system.

FIG. 7 illustrates a graphical logic flowchart depicting a method for using a retention system that includes first providing (700) a retention device (1). The retention device (1) includes a body (10) having a channel (20) disposed in the body (10) along a substantially linear axis (22), the channel (20) having at least one arcuate-shaped cross section (24) beginning at a first distal end (110) of the pin (100) of the channel, a receiving socket (30) disposed in the body (10) at a second distal end (150) of the channel (20), the receiving socket (30) including at least one recessed spherical-shaped section (32), and a continuous slot (40) extending through the body (10) to the channel (20) and defining a substantially linear section (42) from the first distal end (26) of the channel (20) along the substantially linear axis (22) of the channel (20) to the second distal end (150) of the channel (20), and extending through the body (10) to the receiving socket (30) and defining a substantially 90-degree arcuate section (44) from a first point (46) orthogonal to the substantially linear axis (22) at the second distal end (150) of the channel (20) to a second point (48) on the substantially linear axis (22) of the channel (20).

The method further provides (710) a pin (100) having a first distal end (110) with a substantially spherical section (112), a rod-shaped section (120) connected to the first distal end (110) of the pin (100), a shoulder section (130) connected to the rod-shaped section (120), and a fastener mechanism (140) connected to the shoulder section (130) at a second distal end (150) of the pin (100).

The method further provides positioning (720) the substantially spherical section (112) of the pin (100) proximate the first distal end (26) of the channel (20) of the retention device (1), then translating (730) the substantially spherical section (112) of the pin (100) through a portion of the channel (20) of the retention device (1), wherein the longitudinal axis (160) of the pin (100) is oriented at a substantially orthogonal angle relative to the substantially linear axis (22) of the channel (20) section during translation. The method further provides translating (740) the first spherical end of the pin (100) from the channel (20) into the recessed spherical-shaped section (32) of the receiving socket (30), and then rotating (750) the pin (100) about the receiving socket (30) such that the longitudinal axis (160) of the pin (100) is substantially aligned with the substantially linear axis (22) of the channel (20).

The method further provides that when the longitudinal axis (160) of the pin (100) is substantially aligned with the substantially linear axis (22) of the channel (20), the pin (100) within the receiving socket (30) is prevented (760) from translating out of the spherical-shaped socket and into the channel (20) section, while still simultaneously allowing the pin (100) to freely rotate about the longitudinal axis (160) of the pin (100).

The method further provides rotating the pin (100) about its longitudinal axis (160) while the substantially spherical section (112) of the pin (100) is seated in the recessed spherical-shaped section (32) of the receiving socket (30). The method may further provide a locking mechanism that causes a locking block (74) to protrude into the channel (20) configured to restrain any movement of the pin (100) when the pin (100) is seated within the receiving socket (30). When a locking block (74) mechanism is provided as described, the method may further provide either moving the locking block (74) mechanism to cause the locking block (74) to protrude into the channel (20), or moving the mechanism to remove the locking block (74) from the channel (20).

The method further provides rotating the pin (100) out of being substantially aligned with the substantially linear axis (22) of the channel (20) into a position being substantially orthogonal with the substantially linear axis (22) of the channel (20). The method further provides translating the pin (100) away from the receiving socket (30) and along the substantially linear axis (22) of the channel (20).

Thus, the above disclosure provides new and improved devices, systems and methods of use for a retention device. While the invention has been shown and described with respect to the above described embodiments, it is not thus limited. Numerous modifications, changes and enhancements will now be apparent to the reader.

What is claimed is:

1. A retention system comprising:
   a retention device having a body including:
   a channel disposed in the body along a linear axis, the channel having at least one arcuate-shaped cross section beginning at a first distal end of the channel;
   a receiving socket disposed in the body at a second distal end of the channel, the receiving socket including at least one recessed hemi-spherical-shaped section; and
   a continuous slot extending through the body to the channel and defining a linear section from the first distal end of the channel along the linear axis of the channel to the second distal end of the channel, and the continuous slot extending through the body to the receiving socket and defining a 90-degree arcuate section from a first point orthogonal to the linear axis at the second distal end of the channel to a second point on the linear axis of the channel; and
   a pin including:
   a first distal end of the pin having a hemi-spherical section;
   a rod-shaped section connected to the first distal end of the pin; and
   a shoulder section connected to the rod-shaped section;
   wherein a thickness of the continuous slot extending through the body receives the rod-shaped section of the pin, allows free rotation of the pin around a longitudinal axis of the pin within the continuous slot along the linear axis of the channel, and prevents motion of the pin along the linear axis of the channel when the longitudinal axis of the pin is co-linear with the linear axis of the channel.

2. The retention system according to claim 1, wherein the continuous slot is further disposed to extend through the receiving socket past the second point on the linear axis of the channel to receive the rod-shaped section of the pin when the longitudinal axis of the pin is co-linear with the linear axis of the channel.

3. The retention system according to claim 1, wherein the linear axis of the channel is disposed at a greater distance from a rear surface of the body than a distance from a front surface of the body.

4. The retention system according to claim 1, wherein the body further comprises a unitary interior surface area of an elongated open-sided cone-shaped section connected to the first distal end of the channel.

5. The retention system according to claim 4, wherein the linear axis of the channel is disposed at a greater distance from a rear top portion of the unitary interior surface area of the elongated open-sided cone-shaped section than a distance from a front top portion of the unitary interior surface area of the elongated open-sided cone-shaped section proximate the first distal end of the channel.

6. The retention system according to claim 1, wherein the receiving socket further comprises a receiving socket insert, the receiving socket insert being formed separate from the body and formed of material having a hardness rating greater than a hardness rating of the body material.

7. The retention system according to claim 6, the retention device further comprising:
a spring-biased clip assembly disposed on a back portion of the body opposite the channel,
wherein the spring-biased clip assembly secures the receiving socket insert within the body of the retention device.

8. A method of using a retention system, the method comprising:
providing a retention device including a body including:
a channel disposed in the body along a linear axis, the channel having at least one arcuate-shaped cross section beginning at a first distal end of the channel;
a receiving socket disposed in the body at a second distal end of the channel, the receiving socket including a recessed hemi-spherical-shaped section; and
a continuous slot extending through the body to the channel and defining a linear section from the first distal end of the channel along the linear axis of the channel to the second distal end of the channel, and the continuous slot extending through the body to the receiving socket and defining a 90-degree arcuate section from a first point orthogonal to the linear axis at the second distal end of the channel to a second point on the linear axis of the channel;
providing a pin including:
a first distal end of the pin having a hemi-spherical section;
a rod-shaped section connected to the first distal end of the pin; and
a shoulder section connected to the rod-shaped section;
positioning the hemi-spherical section of the pin proximate the first distal end of the channel of the retention device;
translating the hemi-spherical section of the pin through a portion of the channel of the retention device, wherein a longitudinal axis of the pin is oriented at a orthogonal angle relative to the linear axis of the channel during translation;
translating the hemi-spherical section of the pin from the channel into the recessed hemi-spherical-shaped section of the receiving socket;
rotating the pin about the receiving socket such that the longitudinal axis of the pin is aligned with the linear axis of the channel; and
when the longitudinal axis of the pin is aligned with the linear axis of the channel, preventing the pin within the receiving socket from translating out of the receiving socket and into the channel and simultaneously allowing the pin to freely rotate about the linear axis of the channel, and
wherein a thickness of the continuous slot extending through the body receives the rod-shaped section of the pin and prevents motion of the pin along the linear axis of the channel when the longitudinal axis of the pin is approximately co-linear with the linear axis of the channel.

9. The method of using a retention system according to claim 8, further comprising:
rotating the pin about the longitudinal axis of the pin while the hemi-spherical section of the pin is seated in the recessed hemi-spherical-shaped section of the receiving socket.

10. The method of using a retention system according to claim 8, further comprising:
providing a locking mechanism that includes a blocking element capable of protruding into the channel and configured to restrain any movement from the pin when the pin is seated within the receiving socket.

11. The method of using a retention system according to claim 10, further comprising:
one of moving the locking mechanism to cause the blocking element to protrude into the channel, or moving the locking mechanism to remove the blocking element from the channel.

12. The method of using a retention system according to claim 8, further comprising:
rotating the pin out of being aligned with the linear axis of the channel into a position being orthogonal to the linear axis of the channel.

13. The method of using a retention system according to claim 11, further comprising:
translating the pin away from the receiving socket and along the linear axis of the channel.

* * * * *